Figure 1:
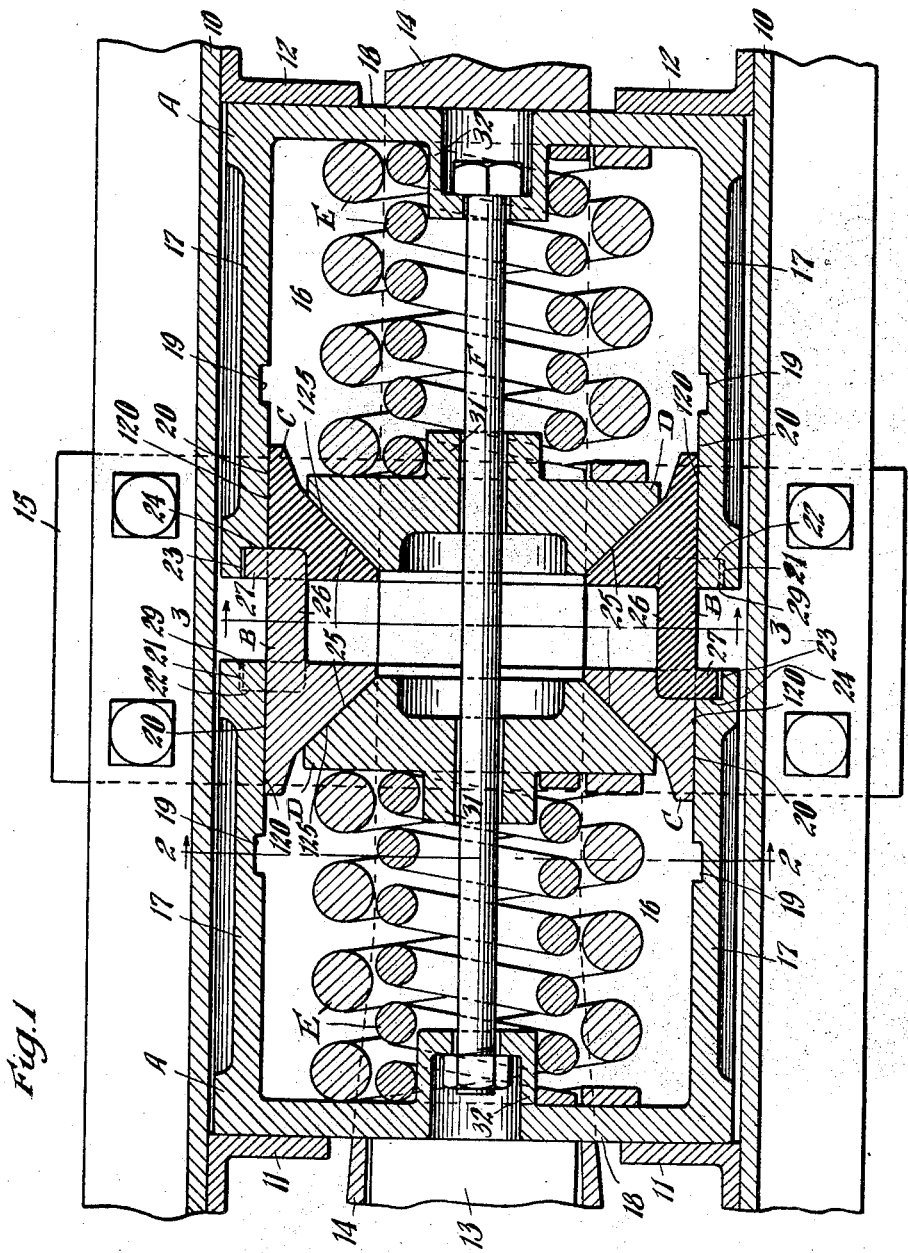

May 25, 1926.

J. F. O'CONNOR 1,585,679

FRICTION SHOCK ABSORBING MECHANISM

Filed Dec. 17, 1923  2 Sheets-Sheet 1

Witnesses
Wm. Geiger

Inventor
John F. O'Connor
By George I. Haight
His Atty.

May 25, 1926.
J. F. O'CONNOR
1,585,679
FRICTION SHOCK ABSORBING MECHANISM
Filed Dec. 17, 1923    2 Sheets-Sheet 2
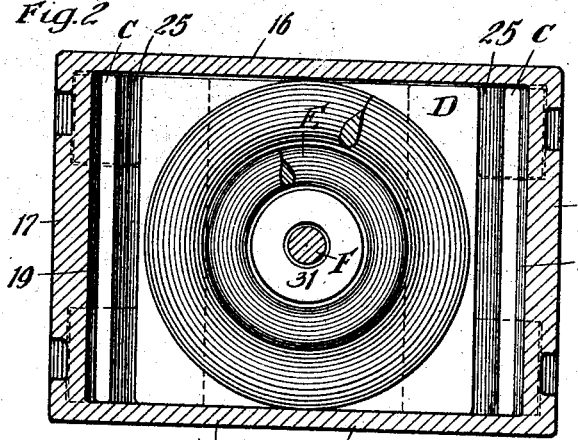
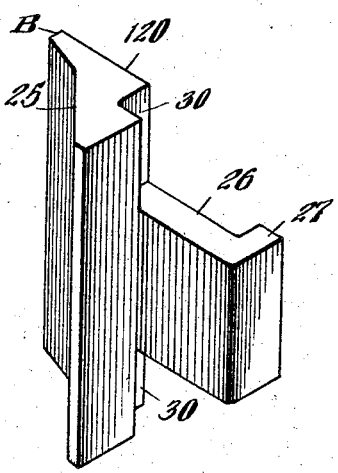
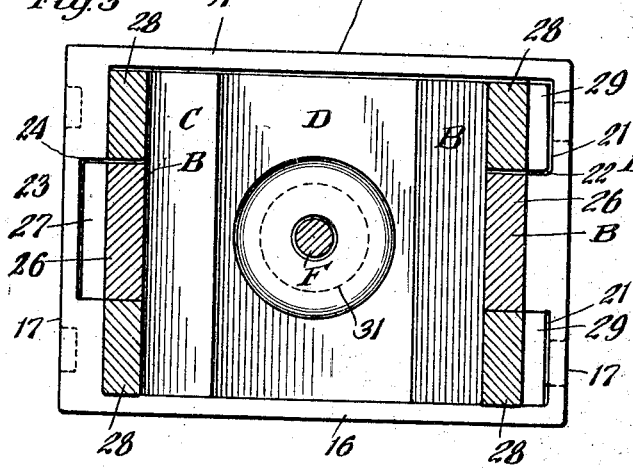
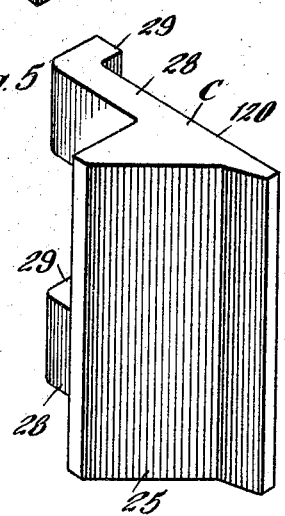
Witnesses
Wm. Geiger
Inventor
John F. O'Connor
By George J. Haight
His Atty.

Patented May 25, 1926.

1,585,679

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 17, 1923. Serial No. 681,047.

This invention relates to improvements in friction shock absorbing mechanisms.

One object of the invention is to provide a friction shock absorbing mechanism especially adapted for railway draft riggings, wherein high capacity, together with certain release, is obtained by a system of tandem arranged springs and co-acting friction means.

A specific object of the invention is to provide a mechanism of the character indicated which includes tandem arranged springs and friction shells together with friction shoes co-acting with the shells, whereby high frictional capacity is obtained in addition to the resistance offered by the springs.

A still further object of the invention is to provide a tandem gear wherein the space ordinarily required for the intermediate stops and yoke thimble of a well-known type of tandem spring gear, is effectively utilized for producing additional capacity by means of friction devices.

A still more specific object of the invention is to form the intermediate followers of a tandem gear as friction creating units to co-operate with friction shells so that the intermediate followers possess the double function of co-operating with the springs to effect the tandem spring compression and simultaneously generate additional friction capacity.

Other objects and advantages of the invention will more clearly appear from the description and claims hereinafter following.

In the drawings forming a part of this specification, Figure 1 is a horizontal, longitudinal, sectional view of a portion of a railway draft rigging, showing my improvements in connection therewith. Figures 2 and 3 are vertical, sectional views corresponding substantially to the lines 2—2 and 3—3 of Figure 1. And Figures 4 and 5 are detailed perspective views respectively of two different friction shoes used in connection with my improved mechanism.

In said drawings, 10—10 indicate channel draft sills of a railway car underframe, to the inner faces of which are secured front stop lugs 11 and rear stop lugs 12. A portion of the drawbar is shown at 13, to which is attached a hooded yoke 14. The shock absorbing mechanism proper, is disposed within the yoke 14 and the movable parts of the draft rigging are supported by a detachable saddle plate 15.

The improved shock absorbing mechanism proper, comprises broadly, front and rear follower casings or shells A—A; two friction shoes B—B; two friction shoes C—C; front and rear spring followers D—D; tandem arranged spring resistance elements E—E; and a retainer bolt F.

The front and rear follower casings or shells A—A are of like construction, being of hollow rectangular form, each having horizontal top and bottom walls 16—16, vertical side walls 17—17 and a transverse end wall 18, the latter functioning as a follower in conjunction with the corresponding stop lugs. Inwardly of the open end of each shell, each side wall is provided with a vertical groove 19, and between the grooves and the outer end of each shell, the side walls present opposed friction surfaces 20. The grooves 19 prevent accumulation of metal at the inner ends of the friction surfaces, which might otherwise occur due to scoring of the parts. One of the side walls of each shell at the open end thereof is recessed on the inner side adjacent the top and bottom respectively to provide a pair of seats 21, each presenting a vertically disposed shoulder 22. The opposite wall of each shell at the outer end thereof is also recessed on the inner side to provide a seat 23 disposed midway between the top and bottom walls, presenting a vertically disposed shoulder 24. The front and rear shells A—A are reversely arranged so that the wall 17 of each shell having the seat 21 therein is disposed on the same side of the gear as the wall 17 of the other shell having the seat 23 therein, the seats 21 of each shell being thus directly opposed to the seat 23 of the other shell.

The two friction shoes B—B are of like construction, each having an outer flat side face 120 and an inner wedge face 25. One of the shoes D is disposed within the rear shell at one side of the gear and has the face 120 thereof co-acting with the friction surface 20 on the wall 17 having the seats 21 and the other shoe B is disposed within the front shell on the opposite side of the gear and has the face 120 thereof co-acting with the friction surface 20 of the wall 17 having the seats 21. Each of the shoes B is also provided with a longitudinally extending, centrally disposed arm 26 having its free end laterally extended outwardly as indicated at 27, the lateral extension 27 of the shoe associated with each shell being seated in the corresponding seat 23 of the opposed shell and abutting the shoulder 24 thereof.

The two friction shoes C—C are also of like construction each having a similar outer flat side face 120 and a similar inner wedge face 25. One of the shoes C is disposed within each shell at the side opposite to the shoe B and has the surface 120 thereof co-acting with the friction surface 20 of the corresponding side wall of the shell. Each of the shoes C is provided with spaced upper and lower longitudinally disposed arms 28. Each of the arms 28 is laterally extended as indicated at 29. The lateral extensions 29 of the arms of the shoe C associated with each shell are seated respectively in the upper and lower seats 21 at the same side of the opposed shell and abut the shoulders 22 thereof. The arms 28 of each shoe C slidably receive the arm 26 of the corresponding shoe B therebetween, the latter being cut away at its top and bottom sides as indicated at 30—30 to accommodate the outer ends of the arms 28. Each shoe C is similarly cut between the arms 28 as clearly shown in Figure 1 to receive the arm 26 of the corresponding shoe B.

The two spring followers D—D, which are of like construction, are disposed respectively in the front and rear shells. Each of the spring followers is in the form of a rectangular block having a pair of outer wedge faces 125 at the opposite sides thereof adapted to coact respectively with the faces 25 of the two shoes B and C of the corresponding follower shell.

The spring resistance elements E—E are arranged in tandem, one being disposed in each shell. Each spring resistance element E comprises an inner relatively light coil and an outer relatively heavy coil interposed between the corresponding spring follower and the rear wall of the corresponding shell, the springs being held properly centered by a solid boss 31 and a hollow boss 32 projecting respectively from the spring follower and the rear wall of the shell and extending into the inner coil of the spring resistance.

The mechanism is held in assembled relation and under initial compression by a retainer bolt F having its opposite ends anchored respectively in the hollow bosses 32 of the front and rear shells and extending through the inner coils of the two spring resistance elements E and alined openings in the two spring followers D—D.

The operation of my improved shock absorbing mechanism is as follows, assuming a buffing movement of the front follower casing A. The front follower casing A will be moved rearwardly relatively to the pair of shoes B and C co-acting with the friction surfaces 20 thereof, the said shoes B and C being held relatively stationary by engagement with the abutment shoulders 22 and 24 of the rear shell. At the same time, the pair of shoes B and C co-acting with the friction surfaces 20 of the rear shell will be moved rearwardly in unison with the front shell by the shoulders 22 and 24 of the latter. As the front shell moves rearwardly, the spring resistance E within each shell will be compressed between the end wall of the shell and the corresponding spring follower, the spring follower associated with the front shell being forced against the relatively stationary shoes B and C with the wedge faces of which it co-acts, and the spring follower associated with the rear shell being forced rearwardly by engagement of the wedge faces of the pair of rearwardly moving shoes B and C with the wedge faces thereof. During this action, the shoes composing each set will be forced apart due to the wedging action of the spring followers and the friction surfaces of the shoes will be pressed against the surfaces 20 of the respective shells, thereby setting up frictional resistance opposing relative movement of the shells in addition to the resistance offered by the springs E, correspondingly increasing the capacity of the gear. The described action will continue until the inner ends of the shells abut, whereupon the forces will be transmitted directly through the shells to the rear stop lugs 12—12 preventing the springs from being driven solid. Upon removal of the actuating pressure, the parts will be returned to normal position by the expansive action of the spring elements. During draft, the action is the reverse of that just described, the rear follower being moved toward the front follower which is held stationary by engagement with the front stop lugs.

As wear occurs on the various friction surfaces and wedge faces, compensation therefor will be had due to the expansion of the springs E which, as hereinbefore pointed out, are under initial compression, proper clearance being left between the side walls of the seats 21 and 23 and the extensions of the arms of the various shoes to permit the necessary lateral spreading of the shoes.

From the preceding description taken in connection with the drawings, it will be evident that all the parts of the gear, including the shells, spring followers and springs, are made in duplicate, thereby effecting great economy in the cost of manufacture. It will also be evident that I have provided a gear having all the characteristics of and possessing all the advantages of both tandem spring and friction gears.

From the preceding description, taken in connection with the drawing, it will be observed that all of the parts except the springs may be made in the form of castings, each of simple and economical design, and that I obtain great column strength for absorbing the ultimate shocks.

I have herein shown and described what I now consider the preferred manner of carrying out my invention, but the same is merely illustrative, and I contemplate all changes and modifications that come within the scope of the claims appended hereto.

I claim:

1. In a friction shock absorbing mechanism, the combination with a pair of relatively movable followers having longitudinally disposed friction surfaces; of tandem arranged springs co-acting with said followers; and a friction wedge system movable with each follower, said systems being interposed between said springs, said systems being longitudinally movable relatively to each other, each system including friction shoes engaging the friction surfaces of one of said followers and a wedge co-operating with the shoes.

2. In a friction shock absorbing mechanism, the combination with a pair of relatively movable follower shells having interior, longitudinally disposed friction surfaces; tandem arranged springs co-acting with said follower shells; and a friction wedge system movable with each follower shell and movable longitudinally relatively to the other follower shell, each system including friction elements co-acting with the friction surfaces of said last-named shell, and a wedge co-operating with the friction elements, said systems being interposed between said tandem arranged springs.

3. In a friction shock absorbing mechanism, the combination with relatively movable front and rear follower shells; of tandem arranged springs co-acting with said follower shells; a friction wedge system co-acting with each shell, said systems including friction wedge members movable in unison with each shell and frictionally engaging the other shell; and additional wedge members interposed between said springs and co-acting with said first named wedge members.

4. In a friction shock absorbing mechanism, the combination with relatively movable friction shells; of tandem arranged springs within said shells; friction shoes directly engaged by each shell and movable in unison therewith and frictionally co-acting with the other shell; and wedge means co-acting with the friction shoes of each shell, said wedge means being interposed between said springs.

5. In a friction shock absorbing mechanism, the combination with a pair of relatively movable friction shells; of tandem arranged springs within said shells; a spring follower co-acting with each spring; and friction shoes frictionally co-acting with each shell and movable in unison with the other shell, said shoes and spring followers having co-acting wedge faces thereon.

6. In a friction shock absorbing mechanism, the combination with a pair of relatively movable friction shells; of tandem arranged springs within said shells; friction means movable in unison with each shell and frictionally engaging the other shell; and a wedge-acting spring follower means co-acting with each friction means, said spring follower means being interposed between said tandem arranged springs.

7. In a friction shock absorbing mechanism, the combination with a pair of relatively movable friction shells; a pair of shoes co-acting with each shell, said shoes being movable in unison with the other shell; a spring follower having wedge means thereon co-acting with each pair of shoes; and a spring resistance element within each shell co-acting with one of said spring followers.

8. In a friction shock absorbing mechanism, the combination with front and rear follower shells; of a friction element movable in unison with each shell and frictionally engaging with the other shell; a wedge acting spring follower within each shell co-acting with the corresponding friction element; and means within each shell for yieldingly resisting relative inward movement of the corresponding spring follower.

9. In a friction shock absorbing mechanism, the combination with tandem arranged springs; of front and rear main followers co-operating with said springs, said front and rear followers each having a friction shell thereon; pressure-transmitting means co-operating with each follower and movable respectively therewith, each of said pressure-transmitting means comprising a plurality of friction elements and spreading means for said elements, said spreading means co-operating with the tandem arranged springs respectively, the friction shell of the front follower co-operating with the friction elements of said pressure-transmitting means movable with the rear follower, and the friction shell of the rear follower co-operating with the friction elements of the pressure-transmitting means movable with the front follower; and means for maintaining a fixed distance between each main follower and the friction elements co-operating with the other main follower.

10. In a friction shock absorbing mechanism, the combination with tandem arranged springs; of front and rear main followers, each having a friction shell movable in unison therewith; front and rear pressure-transmitting means movable respectively with said rear and front followers, each of said pressure-transmitting means being expandible and having friction surfaces thereon, said front pressure-transmitting means co-operating with the friction shell associated with the front main follower and said rear pressure-transmitting means having the friction surfaces thereof co-operating with the friction shell associated with the rear main follower; and column acting means interposed between each pressure-transmitting means and the corresponding remote friction shell.

In witness that I claim the foregoing I have hereunto subscribed my name this 12th day of December, 1923.

JOHN F. O'CONNOR.